E. MÖLLER.
ART OF SEPARATING SUSPENDED PARTICLES FROM GASES.
APPLICATION FILED AUG. 11, 1911.
1,357,466.
Patented Nov. 2, 1920.
2 SHEETS—SHEET 1.
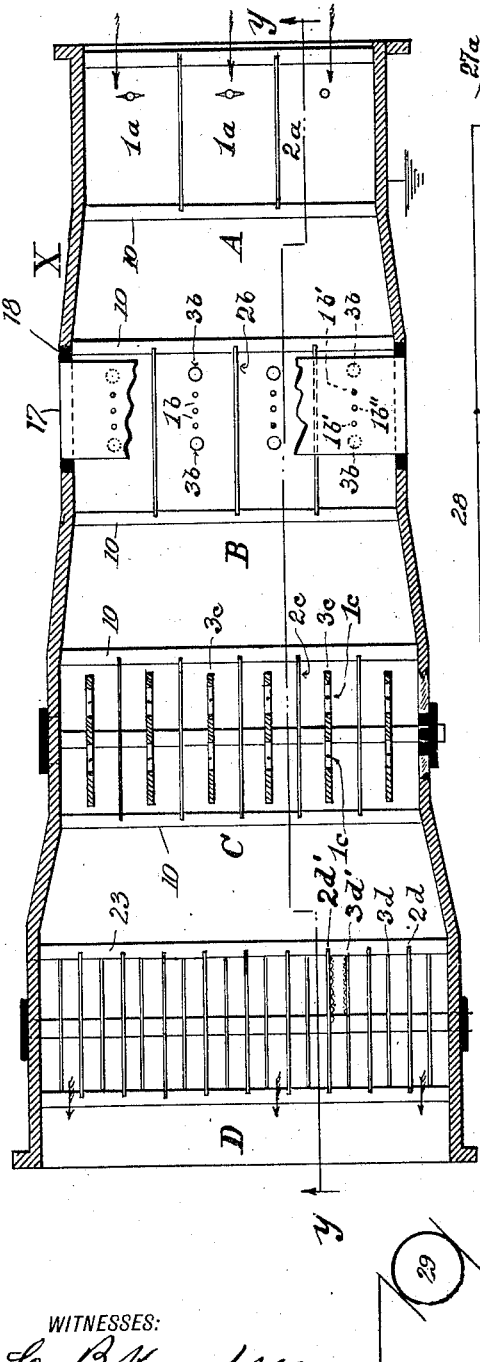
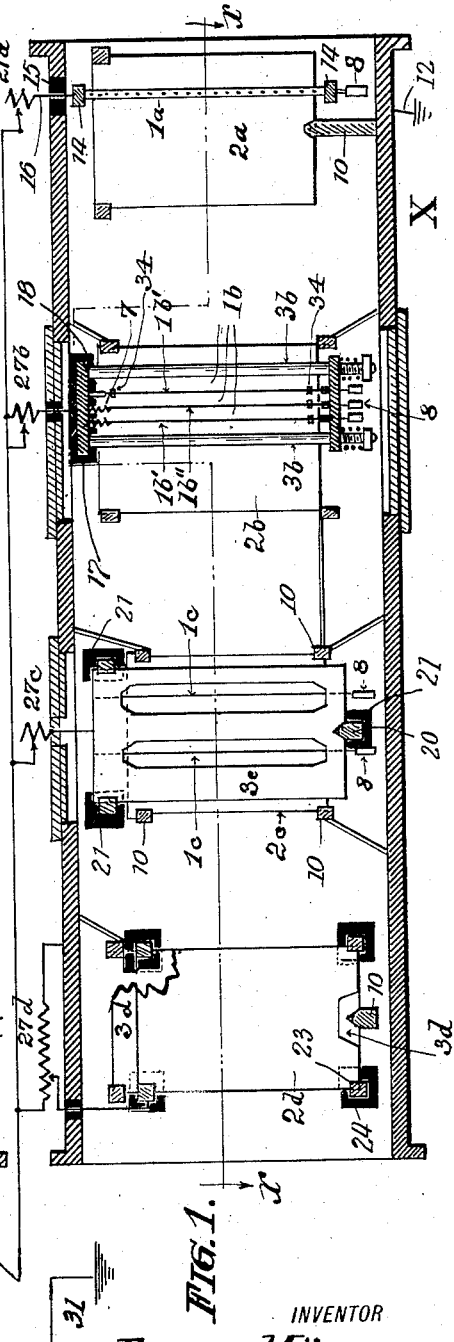
WITNESSES:
INVENTOR
ERWIN MÖLLER
BY
ATTORNEYS.

UNITED STATES PATENT OFFICE.

ERWIN MÖLLER, OF BRACKWEDE, GERMANY, ASSIGNOR, BY MESNE ASSIGNMENTS, TO THE CHEMICAL FOUNDATION, INC., A CORPORATION OF DELAWARE.

ART OF SEPARATING SUSPENDED PARTICLES FROM GASES.

1,357,466. Specification of Letters Patent. Patented Nov. 2, 1920.

Application filed August 11, 1911. Serial No. 643,568.

*To all whom it may concern:*

Be it known that I, ERWIN MÖLLER, a citizen of the Empire of Germany, and a subject of the King of Prussia, residing at Brackwede, in the Province of Westphalia, Germany, have invented certain new and useful Improvements in the Art of Separating Suspended Particles from Gases, of which the following is a specification.

This invention relates to electrical separation of suspended matter from gases, and the main object of the invention is to perform this operation in an efficient and thorough manner. It is a distinctive feature of the present invention that the separation of the suspended matter is performed by a series of successive operations, wherein the particles are first charged and then subjected to the action of electrostatic fields of progressively increasing effectiveness, so that the suspended matter is removed in stages.

Another object of the invention is to subject the particles which have been charged by ionization of the gas, to electrostatic fields for reinforcing and supplementing the action of the ionizing electrodes, in causing separation of the charged particles.

The accompanying drawings illustrate an apparatus suitable for carrying out my invention, and referring thereto:

Figure 1 is a vertical section of the apparatus, on line Y. Y. in Fig. 2.

Fig. 2 is a horizontal section on line X. X. in Fig. 1.

Figure 3:
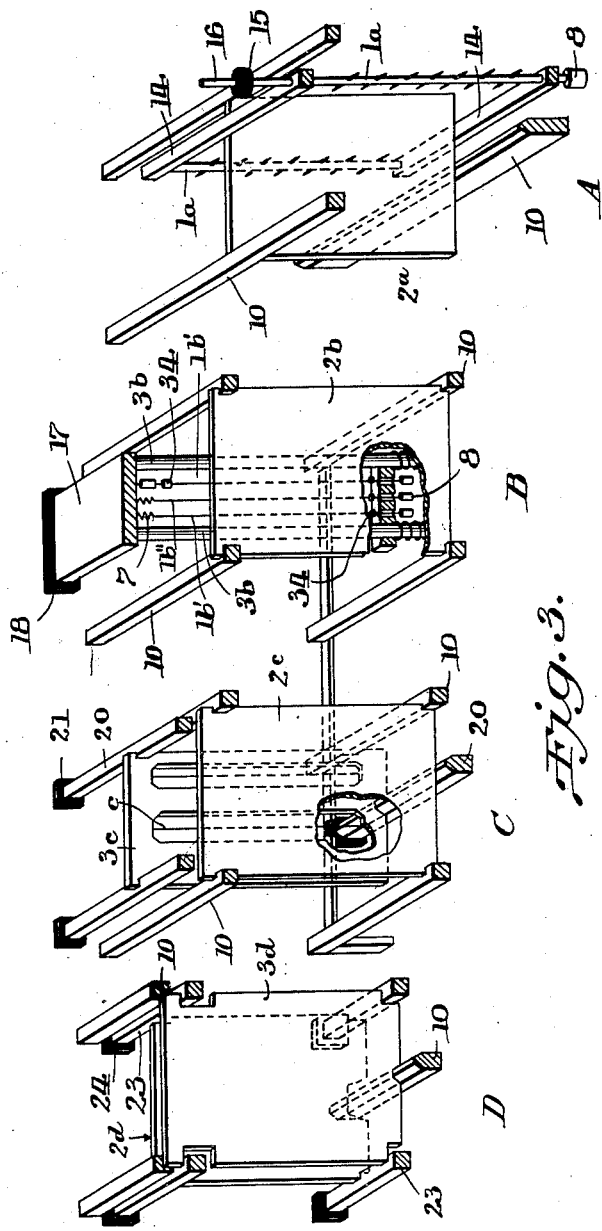

Fig. 3 comprises a schematic view of my apparatus.

In the present invention, as carried out in the apparatus illustrated in the drawing, it is assumed that the gases carrying the suspended particles enter, and pass through, a conduit or passage X, in the direction shown by winged arrows in Fig. 2, and are subjected in said conduit, to the action of electric fields, to cause separation of suspended matter therefrom. Conduit X preferably increases in capacity, or cross-section, from the entrance to the exit for the gases, so that the gases entering the conduit at a certain velocity, are reduced in velocity as they pass through the conduit.

Within the conduit X are provided electrodes arranged in sets A. B. C. and D., located so as to act successively on the gases passing through the conduit. Such electrodes comprise charging electrodes $1^a$, $1^b$, $1^c$, for producing electric fields for charging the suspended particles, $3^b$, $3^c$, $3^d$, for producing electrostatic fields for causing separation of the charged particles from the gases, and electrodes $2^a$, $2^b$, $2^c$, and $2^d$, for coöperating with the aforesaid electrodes to produce the charging and electrostatic fields.

Electrodes $2^a$, $2^b$, $2^c$, and $2^d$, of the respective sets may consist of plates supported by bars 10 extending across the conduit and supported on the walls thereof, said bars being conductors and connecting said electrodes to one side of the charging circuit, for example to ground, in case of a grounded circuit; the conduit X in that case being of conducting material and being grounded as shown at 12.

The charging electrodes $1^a$, $1^b$, $1^c$ are adapted to promote ionization of the gases adjacent thereto consisting, for example, of rods $1^a$, having pointed projections as shown in set A., or of fine wires $1^b$, $1^c$, as shown in sets B. and C. These wires may be covered or coated, and instead of wires any linearly extending electrodes, such as strips of metal of suitable thicknes and width, may be used.

The function of the first set of electrodes is, to produce initial ionization of the gases, and to cause separation of relatively large particles, such as fibers. Since, on the one hand, such large particles can be readily electrified and thereby more readily removed from the gas, and, on the other hand, they are apt to clog the spaces between the electrodes; the electrodes $1^a$, and $2^a$ of the first set are placed relatively far apart. Moreover, since uniformity of discharge is not so essential in this initial action, the electrodes of the form shown at $1^a$ may be used to advantage, as they are more readily maintained and kept clean than fine wires would be. The ionizing electrodes $1^a$ of this set are shown as mounted on frame bars 14, one of which is supported by an insulator 15 formed, for example, as a bushing in the top of conduit X, the connection 16 for supporting and leading current to electrodes $1^e$ being connected to top frame bar 14 and passing through this bushing.

In the second set B of electrodes, the space between the ionizing electrodes $1^b$ and the electrodes $2^b$ is shorter than the corresponding space in the first set, so as to distribute the charging effect more uniformly and effectively in the gas, and on account of the closer spacing and of the widening of the conduit X, the number of electrodes is increased so as to increase the effective area of the ionizing electrodes. This effectiveness, both as to uniformity and as to increase of area are also increased in this set B by use of the linearly extended electrodes such as fine wires as shown at $1^b$, and by providing a plurality of such wires arranged in parallelism opposite each electrode $2^b$. These ionizing electrodes $1^b$ are shown as suspended from a bar 17, supported in insulators 18 in the side walls of conduit X, said bar 17 also supporting electrostatic field producing electrodes $3^b$, formed for example as rods or wires of greater cross section than the ionizing electrodes $1^b$ and extending parallel thereto. The ionizing electrodes are preferably arranged in rows, parallel to electrodes $2^b$, the electrostatic field producing electrodes being at the ends of such rows. By reason of the greater thickness of the rods $3^b$ as compared with the wires $1^b$, the ionizing action of said rods is relatively slight, their function being, primarily, to reinforce or strengthen the electrostatic field for causing migration of the charged particles. The reinforcing action is more pronounced on the outer wires $1^{b'}$ of the rows than on the intermediate wires $1^{b''}$, thereby approximating a more equal discharge from the several wires of the row. Another important use of the rods or thicker wires $3^b$ is to protect the finer wires from injury or destruction in case of the formation of electric arcs.

Suitable tensioning means, such as springs 7 or weights 8 are preferably provided for holding the ionizing electrodes in position. In case fine wires are used as ionizing electrodes, vibration damping means may be provided therefor consisting, for example, of weights 34 attached to wires at points where vibration is liable to be pronounced.

In the succeeding sets of electrodes the electrodes $1^c$ and $2^c$ are closer together than in the preceding set, and the electrostatic field producing electrodes $3^c$ are adapted to produce a stronger reinforcing action, said electrodes $3^c$ being of relatively extended surface or area and formed, for example, as plates carried by bars 20 mounted on insulators 21 on side walls of conduit X, so as to alternate with and extend parallel to electrodes $2^c$.

The last set of electrodes consists of electrostatic field producing electrodes $3^d$ and electrodes $2^d$ coöperating therewith, said electrodes $3^d$ alternating with electrodes $2^d$ and being supported parallel thereto by bars 23 extending across the conduit X and mounted on insulators 24. The electrodes of set D are still more closely spaced than those of the preceding set. The closeness of the electrodes therefore increases progressively in successive sets, and the number of electrodes increases, both by reason of this closer spacing and of the widening of the conduit X, so that the gases in passing through the conduit are subjected to more closely applied and more extensive electrostatic field surfaces.

In some cases it may be desirable to roughen the electrode surfaces, or some of them, or to impart to them a pubescent quality as indicated in $2^{d'}$ and $3^{d'}$, Fig. 2, to increase their effectiveness.

The number, shape and size of the electrodes in each set, and the number of sets employed, will depend on the character of gases to be treated and the percentage, kind and quantity of the suspended particles therein, so that at any stage of the method, a greater or less number of any of the electrodes may be used, in parallel, or in series, and any number of steps may be combined in one or may be omitted if desired. The various parts of the apparatus may also be modified without departing from the principle of the invention, for example, the electrodes may be otherwise than plane and are not necessarily parallel to one another or to the direction of flow of the gas. Any suitable means is provided for supplying electricity at high tension to the sets of electrodes above described. Since the different electrode sets A, B, C and D, generally require different voltages and current, voltage and current regulating devices $27^a$, $27^b$, $27^c$ and $27^d$ may be interposed between the wire 28 leading from the high tension source 29, said devices consisting, for example, of regulable resistances, such resistances also serving to make the operation of the apparatus more steady. In case a grounded circuit is used, one side of the source is grounded as at 31, the electrodes 23 of each set being also grounded through the walls of the conduit as above described, so as to complete an electric circuit including the electrodes.

My method is carried out as follows:

The gas carrying suspended particles enter the conduit X in the direction of the arrows and passes first between the electrodes $1^a$ and $2^a$ of the first set, electrodes $1^a$ being charged with high tension electricity from the connection 28 to the source 29— ionization of the gas takes place adjacent to the pointed projections of said electrodes, with the result that the suspended particles become charged and migrate toward the electrodes $2^a$ under the action of the electrostatic field existing between electrodes 1<sup>a</sup> and 2<sup>a</sup>. The coarser or larger particles will be more effectually charged and are deposited or collected, in large measure on the electrodes 2<sup>a</sup> before the gas passes the first set of electrodes, the electrodes 2<sup>a</sup> being preferably extended a considerable distance beyond electrodes 1<sup>a</sup>, in the direction of flow of the gas, to provide more opportunity for collection of these heavier particles. The gas, from which the heaviest particles have been removed then passes between the electrodes of the second set where it is subjected to a more effective separating action, by means of the closer spacing of the electrodes and the greater area presented thereby causing a more uniform and effective distribution of the ionizing action in the gas, and by reason of the stronger ionizing action in the gas, and by reason of the stronger ionizing and displacing actions due to the strengthening of the fields.

In passing to this second set, the velocity of the gas is reduced, by means of the increase in cross section of the conduit, so that the time during which the gas is subjected to the separating action is correspondingly increased. A further increase in precipitating effect is secured by the electrostatic fields produced by the electrodes 3<sup>b</sup>, which serve to aid in forcing to the collecting electrodes 2<sup>b</sup>, the particles charged by the ionizing action of the fine wire electrodes 1<sup>b</sup>, as well as the particles which have been charged in the first set A, but have escaped therefrom without precipitation. By this means a further amount of suspended matter is removed and the gas then passes to the next set C where it is subjected to the action of still more closely arranged electrodes and causing precipitation of a still further quantity of suspended matter. The successive sets of electrodes of progressively increasing effectiveness will, in general, have the effect of separating the suspended matter from the gas in stages, the larger particles, for example, being separated in the first set of electrodes, somewhat smaller or finer particles by the next set, and this operation may be carried on in as many stages as may be necessary, with a set of electrodes for each stage. After leaving the last ionizing electrodes the gas may still contain charged suspended particles and in order to allow full opportunity for such particles to be collected the gas is passed through the set D, wherein it is subjected to the action of an electrostatic field for forcing the charged particles against the electrodes 2<sup>d</sup>. Any desired number of electrostatic field sets similar to set D may be provided through which the gas is passed after leaving set D or at any intermediate stages, after passing any one of the preceding sets A, B or C. The increasing cross section of the conduit as the gas passes along the same, causes the velocity of the gas to be reduced, so as to subject the gas for a longer time to the action of the electrodes and the effectiveness of the electrodes is progressively increased, by shortening the fields and by extending the area of the electrodes, so that the particles are subjected to a continually increasing separating effect leading to eventual thorough separation.

What I claim is:

1. The method of separating suspended particles from gases, which consists in subjecting the gas to the action of an ionizing discharge of electricity to charge the suspended particles, and then subjecting the charged particles to the action of an electrostatic field of progressively increasing strength.

2. The method of separating suspended particles from gases which consists in causing the gas to flow through an electrostatic field, discharging electricity into the gas while in said field, to charge the suspended particles, and then passing the gas at a reduced velocity, through a stronger electrostatic field.

3. The method of separating suspended particles from gases, which consists in passing the gas through electrostatic fields, discharging electricity into the gas while in said fields, to charge the suspended particles, and then passing the gas in progressively increasing volume at lower speed through a plurality of electrostatic fields, each shorter than the first field but whereby a more effective electro-static action is produced throughout the body of the gas.

4. The method of separating suspended matter from gases which consists in subjecting the gas successively to the action of electrostatic fields of progressively decreasing length, and of progressively increasing number whereby a more effective electrostatic action is produced throughout the body of the gas.

5. The method of separating suspended particles from gases which consists in causing the gas to flow through an electrostatic field, discharging electricity into the gas while in said field, to charge the suspended particles, and then passing the gas through electrotstatic fields of progressively increasing effectiveness.

6. The method of separating suspended particles from gases which consists in passing the gas through an electrostatic field, discharging electricity into said gas while in said field, to charge the suspended particles, and then passing the gas through a plurality of electrostatic fields, each shorter than the first field.

7. An improvement in means for removing suspended particles from gaseous and fluid bodies comprising an active electrode formed of a framework and a plurality of spaced apart wires, and a grounded electrode having one face opposite said wires, said wires being grouped in a manner to produce and direct electromagnetic waves toward the oncoming particle-laden gaseous or fluid streams.

8. An improvement in means for removing suspended particles from gaseous and fluid bodies comprising an active electrode formed of a rectangular frame having a plurality of parallel wires connected to opposite side bars thereof, means for damping the vibrations of said wires, and a grounded electrode having one face opposite said wires.

9. An improvement in means for removing suspended particles from gaseous and fluid bodies comprising a plurality of plate-like grounded electrodes, and a plurality of frames alternating with said electrodes and each provided with a plurality of parallel attenuated electrode members.

10. An improvement in means for removing suspended particles from gaseous and fluid bodies comprising spaced apart grounded electrodes, spaced apart active electrodes each comprising a frame carrying a plurality of attenuated electrode members, and a tie rod connecting the frames of said active electrodes.

11. In the art of producing electrical precipitation of particles from fluid or gaseous streams, opposing electrode systems, the discharge system comprising a rigid frame, a support therefor, and a plurality of discharge producing elements rigidly carried by the frame and extending in parallelism with each other on a common plane corresponding to the direction of flow of the stream, said frame and elements constituting a unit of single charge sign.

In testimony that I claim the foregoing as my invention, I have hereunto set my hand in the presence of two subscribing witnesses.

ERWIN MÖLLER.

Witnesses:
 MICHAEL J. STARK,
 FRIEDA T. LEBENSTEIN.